F. NORMAN.
EXPANDING AND CONTRACTING GAS RECEIVER.
APPLICATION FILED JUNE 24, 1916.
1,217,623.
Patented Feb. 27, 1917.
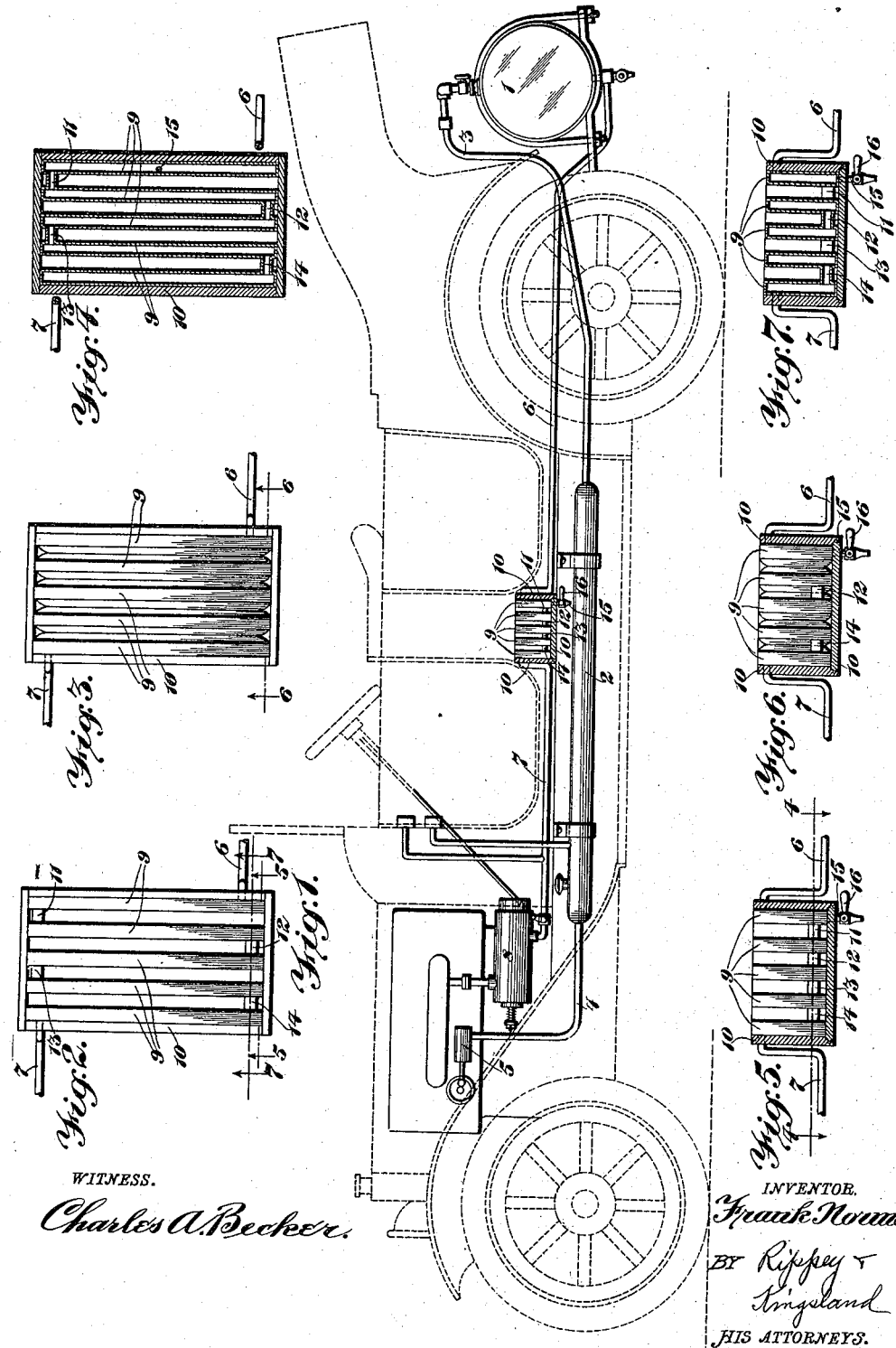
WITNESS.
Charles A. Becker.
INVENTOR.
Frank Norman
BY Rippey & Kingsland
HIS ATTORNEYS.

UNITED STATES PATENT OFFICE.

FRANK NORMAN, OF DES MOINES, IOWA, ASSIGNOR OF EIGHT THIRTY-SECONDS TO DOUGLAS J. LANDERS, SEVEN THIRTY-SECONDS TO WILLIAM A. McATEE, FOUR THIRTY-SECONDS TO ALPHONSO B. LOVAN, TWO THIRTY-SECONDS TO GEORGE W. YOUNG, AND ONE THIRTY-SECOND TO WILLIAM T. SHORES, ALL OF SPRINGFIELD, MISSOURI, AND TWO THIRTY-SECONDS TO CLARENCE H. NICHOLS, OF NEW YORK, N. Y.

EXPANDING AND CONTRACTING GAS-RECEIVER.

1,217,623.     Specification of Letters Patent.     Patented Feb. 27, 1917.

Application filed June 24, 1916. Serial No. 105,608.

*To all whom it may concern:*

Be it known that I, FRANK NORMAN, a citizen of the United States, residing at the city of Des Moines, county of Polk, and State of Iowa, have invented a new and useful Expanding and Contracting Gas-Receiver, of which the following is a specification.

This invention relates to gas receivers of the expanding and contracting type.

An object of the invention is to provide a gas receiver adapted for use in acetylene gas generating systems adapted to receive the gas from the generator and to be expanded thereby and to contract automatically to assist in forcing the gas to points of service.

Another object of the invention is to provide a gas receiver composed of a number of receiving chambers in which the gas is received from the generator and through which the gas is circulated and cooled and which is expanded by the pressure of the gas and thereby exerts pressure upon the gas to force it to the point of service.

Other objects will appear from the following description, reference being made to the drawing in which I have illustrated a preferred embodiment of the invention and in which—

Figure 1 is a view illustrating an acetylene gas generating system applied to an automobile and including my improved gas receiver interposed between the generator and engine, and arranged to receive and cool the gas and force it toward the engine.

Fig. 2 is an enlarged plan view of the receiver detached from the system.

Fig. 3 is a corresponding view of the receiver expanded by the gas therein.

Fig. 4 is a horizontal sectional view on the line 4—4 of Fig. 5.

Fig. 5 is a vertical sectional view on the line 5—5 of Fig. 2.

Fig. 6 is a similar sectional view on the line 6—6 of Fig. 3, illustrating the receiving chambers expanded by the gas.

Fig. 7 is a sectional view on the line 7—7 of Fig. 2.

For convenience of illustration I have shown my invention in an acetylene gas generating system applied to an automobile, although it will be apparent that the system may be advantageously employed in different environments for driving internal combustion engines. While the subject matter of the present invention consists only of the gas receiver, nevertheless, it is deemed appropriate to refer briefly to the component elements of the system in order to make clear the real nature and object of the invention.

The acetylene gas is generated in a tank 1 mounted upon suitable supports applied to the automobile. Water is supplied to the generating tank 1 from a water and pressure tank 2, having a valve controlled pipe 3 opening into the tank and receiving pressure through a pipe 4 communicating with a pump 5 driven by the engine of the automobile. The gas from the tank 1 passes through a pipe 6 into the gas receiver which constitutes the subject matter of the present invention and from the gas receiver the gas passes through a pipe 7 and a gas mixer 8 into the manifold of the engine.

As illustrated the gas receiver which constitutes the connection between the pipes 6 and 7 comprises a series of metallic chambers 9 arranged parallel with each other within a box or case 10. The side walls of the box 10 prevent relative displacement or dislocation of any of the chambers 9 and the bottom of the box constitutes a support for upholding the chambers. The pipe 6 opens into one of the chambers 9 near one end thereof, and said chamber has communication with the adjacent chamber through a connecting passage 11 at the end opposite from the communication with the pipe 6. A passage 12 at the end opposite from the passage 11 opens into the next adjacent chamber 9 of the series, which communicates with the next one through a passage 13 at the same end as the passage 11. A similar passage 14 at the opposite ends of the chambers permits further circulation and passage of the gas which is withdrawn from the final chamber of the series through the pipe 7 leading to the mixer of the system. By this arrangement the gas is required to pass longitudinally through all of the chambers of the series and is thereby cooled and reduced to proper temperature for service.

While I have shown five of the chambers 9, it will be understood that the number may be varied as required to maintain efficient service, and I do not confine myself to any specific number of chambers.

In the form illustrated each of the chambers 9 is rectangular and is composed of sheet metal forming impervious walls which yield or expand under the pressure of the gas, so that the adjacent side walls of the chambers are pressed into contact as illustrated in Figs. 3 and 6. The resiliency of the material forming the expansible side walls of the chambers 9 maintains the pressure constant upon the gas within the chambers, so that the gas is thereby forced or urged toward the mixer and the engine. The enlarging or expanding of the receiving chambers permits a considerable quantity of the gas to be retained therein, so as to maintain a constant supply of gas for the mixer and the engine in order to compensate for any variations in the supply of the gas coming from the generator, whether such variations be caused by the movement or vibration of the vehicle, or otherwise. Thus, the receiver efficiently serves the various functions of tempering the gas properly, maintaining a constant and uniform supply for the engine, and acting as a device for urging or forcing the gas under proper and uniform pressure toward the engine.

At least one of the chambers is equipped with a discharge outlet 15 controlled by a manipulative valve 16 through which any accumulations of condensation may be withdrawn.

A receiver thus constructed is very simple in arrangement and, in practical operation, has been found to be highly efficient for the attainment of the various objects and functions described. It is obvious that the number of chambers composing the receiver may be varied to meet different requirements and that the construction and arrangement of the device may be modified in other respects without departing from the principles of the invention. Therefore, I do not restrict myself to identical features of construction and arrangement, but what I claim and desire to secure by Letters Patent of the United States, is:—

1. A gas receiver of the character described, comprising a series of expansible chambers communicating with each other alternately at alternately opposite ends, and arranged so that the walls of the adjacent chambers will be pressed into contact by the pressure of the gas within the chambers, and inlet and outlet passages for admitting and withdrawing gas from the receiver.

2. A gas receiver of the character described, comprising a series of expansible chambers communicating with each other alternately at alternately opposite ends, and arranged so that the walls of the adjacent chambers will be pressed into contact by the pressure of the gas within the chambers, inlet and outlet passages for admitting and withdrawing gas from the receiver, and means for preventing displacement of any of the compartments or chambers of the series.

3. A gas receiver of the character described, comprising a series of chambers having expansible side walls arranged to be pressed into contact with each other by the pressure of the gas within the chambers, means preventing movement of the chambers away from each other, passages connecting adjacent chambers of the series at alternately opposite ends, and supply and withdrawal pipes communicating with the side chambers, respectively, of the series.

4. A gas receiver of the character described, comprising a support, a series of gas receiving chambers mounted on said support and having expansible sides arranged to be pressed into contact with each other by the pressure of the gas within the chambers and to contract out of contact by the inherent resiliency thereof, passages connecting adjacent chambers of the series at alternately opposite ends, whereby the gas is passed through the series of chambers in a tortuous course, and inlet and outlet passages communicating with the side chambers of the series respectively.

5. A gas receiver of the character described, comprising a series of expansible chambers arranged to be expanded by the pressure of the gas and to contract automatically to force the gas therefrom, passages connecting adjacent chambers of the series at alternately opposite ends, elements preventing lateral movement of the chambers at the sides of the series, and inlet and outlet pipes for said chambers.

6. A gas receiver of the character described, comprising a series of expansible chambers arranged to be expanded by the pressure of the gas and to contract automatically to force the gas therefrom, passages connecting adjacent chambers of the series at alternately opposite ends, elements preventing lateral movement of the chambers at the sides of the series, inlet and outlet pipes for said chambers, and means for withdrawing accumulations of condensation from said chambers.

7. An acetylene gas receiver comprising a support, a series of expansible normally contracted chambers mounted on the support out of contact with each other and arranged to be expanded into contact with each other by the pressure of the gas therein, passages connecting adjacent chambers of the series at alternately opposite ends, a passage for admitting the gas into the first chamber of the series, a passage for withdrawing the gas from the last chamber of the series, a passage for withdrawing accumulations of condensation from said chambers, and a valve for controlling said last-named passage.

In witness whereof, I have signed this specification in the presence of two subscribing witnesses.

FRANK NORMAN.

Witnesses:
CHAS. McKNOLLY,
GLADYS DAILY.

Copies of this patent may be obtained for five cents each, by addressing the "Commissioner of Patents, Washington, D. C."